(12) United States Patent
Hart et al.

(10) Patent No.: US 7,445,660 B2
(45) Date of Patent: Nov. 4, 2008

(54) METHOD FOR OPERATING GAS GENERATORS IN TANDEM

(75) Inventors: Russell F. Hart, Blue Grass, IA (US); Adrienne M. Jinks, Round Lake, IL (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 402 days.

(21) Appl. No.: 11/379,288

(22) Filed: Apr. 19, 2006

(65) Prior Publication Data

US 2006/0243133 A1 Nov. 2, 2006

Related U.S. Application Data

(60) Provisional application No. 60/594,659, filed on Apr. 27, 2005.

(51) Int. Cl.
*B01D 53/04* (2006.01)
(52) U.S. Cl. .................. 95/26; 96/115; 96/121
(58) Field of Classification Search ...... 95/23, 95/26, 130; 96/110, 115, 121; 128/204.18, 128/204.21, 205.12, 205.27
See application file for complete search history.

(56) References Cited

U.S. PATENT DOCUMENTS

| | | | | | |
|---|---|---|---|---|---|
| 4,140,495 | A | * | 2/1979 | Pietruszewski | ........ 95/23 |
| 4,643,743 | A | * | 2/1987 | Grader | ........ 95/100 |
| 4,686,974 | A | * | 8/1987 | Sato et al. | ........ 128/204.23 |
| 5,074,893 | A | | 12/1991 | Hursey | |
| 5,112,367 | A | * | 5/1992 | Hill | ........ 95/98 |
| 5,266,101 | A | * | 11/1993 | Barbe et al. | ........ 95/23 |
| 5,494,028 | A | * | 2/1996 | DeVries et al. | ........ 128/205.24 |
| 5,766,310 | A | | 6/1998 | Cramer | |
| 5,858,063 | A | | 1/1999 | Cao et al. | |
| 5,989,313 | A | * | 11/1999 | Mize | ........ 95/10 |
| 6,063,161 | A | * | 5/2000 | Keefer et al. | ........ 95/100 |
| 6,063,169 | A | | 5/2000 | Cramer et al. | |
| 6,409,807 | B1 | | 6/2002 | Hager et al. | |
| 6,585,804 | B2 | * | 7/2003 | Kleinberg et al. | ........ 95/101 |

* cited by examiner

*Primary Examiner*—Frank M Lawrence
(74) *Attorney, Agent, or Firm*—Marsteller & Associates, P.C.

(57) ABSTRACT

A gas generating system (S) has a plurality of product gas generating modules (18) each of which comprises a plurality of molecular sieve beds (bed 1, bed 2) generating a product gas acting in a repetitive cycle with each cycle having a period of the cycle with peak product gas flow (106). A manifold (52) combines the product gas from the plurality of modules (18). The processor (58) generates a control signal that is communicated to the gas generating modules (18) such that the peak product gas flow period (106) of the repetitive cycle of the modules (18) is adjusted in response to the control signal. The processor (58) causes the peak period (106) for the modules (18) to be timed across the repetitive cycles in a controlled distribution.

8 Claims, 2 Drawing Sheets

METHOD FOR OPERATING GAS GENERATORS IN TANDEM

CROSS REFERENCE TO RELATED APPLICATIONS

This application claims the benefit of U.S. Provisional Application Ser. No. 60/594,659, filed Apr. 27, 2005, entitled METHOD FOR OPERATING GAS GENERATORS IN TANDEM.

BACKGROUND OF THE INVENTION

1. Technical Field

The invention relates to the field of gas generators, and more particularly to an electronic control for a pressure swing adsorption apparatus.

2. Background Art

There are a wide variety of applications in which oxygen or another desired product gas is required.

On Board Inert Gas Generating Systems (OBIGGS), or On Board Oxygen Generating Systems (OBOGS) utilize molecular sieves by employing a pressure swing adsorption (PSA) process that has been used for many years to generate either Nitrogen or Oxygen product gas respectively. This known PSA technology uses compressed air or conditioned engine bleed air fed through a valve or valves to pressurize molecular sieves contained in one of a number of canisters. After a predetermined period of time, the valve changes state, venting the one canister full of sieve, then pressurizing the next canister. This process of pressurization and venting is the PSA process. Known PSA systems have been controlled by a rotary valve, driven by a fixed or variable speed motor. Still others utilize a system of dedicated independent valves to control each pressurization and each venting cycle for each canister or bed.

Prior PSA systems have also utilized a linear 4-way slide valve, which connects input air port with the first canister, while connecting a vent port with the second canister. The valve changes state, which connects the vent port with the first canister and simultaneously connecting the second canister with the input air. The linear 4-way slide valve simplifies the complex system of independent dedicated valves necessary on some systems. The linear valve has also proven to be more reliable then either the rotary valve or the system of valves, accomplishing the same tasks.

The linear valve used on typical PSA systems is pneumatically operated. Miniature pilot solenoid valves that are opened and closed using solid state electronics, housed in an EMI shielded enclosure control pilot gas. The pilot solenoids provide gas pressure to two gas cylinders, which are connected to a sliding block. The block slides across a mating plate with three openings or ports. A controller is set to open and close the miniature pilot valves at a predetermined time.

In some applications, the source of new air is limited. Many airborne and ground based systems have a finite source of air. There are many uses for bleed air on rotary and fixed wing aircraft, hence conserving the available air is critical. There have been a number of studies conducted for various concepts for air conservation. A number of these studies have resulted in patents, such as U.S. Pat. Nos. 5,858,063, 6,409,807, and 5,074,893.

Numerous other U.S. patents, such as U.S. Pat. Nos. 5,766, 310, and 6,063,169 as examples, teach oxygen concentrating systems using molecular sieve bed units having two or more molecular sieve beds comprising a molecular sieve oxygen generator. The disclosures of which referenced patents are hereby incorporated in their entirety as if fully set out herein.

PSA type gas concentrators generally present a varying pneumatic load to their air source. Through the course of the PSA cycle the peak airflow drawn from the air source by a concentrator can vary from nearly zero to 3 times the average flow. The peak airflow capability of most air supplies is limited by several factors, such as: compressor capacity, piping diameter and length, presence of additional storage volume, etc. When several PSA concentrators are connected to the same air source, it is desirable to control the phasing of the individual concentrator cycles to minimize the peak airflow demands on the air source. The following graph of FIG. 2 illustrates a typical input airflow versus time for a known PSA concentrator.

It can be seen from FIG. 2 that if the phasing of several concentrator cycles becomes synchronized, or nearly so, the peak airflow demands on the air supply will be increased significantly. In extreme cases the airflow demand may exceed the capability of the air supply and the operating efficiency of the concentrators will be reduced.

While the above cited references introduce and disclose a number of noteworthy advances and technological improvements within the art, none completely fulfills the specific objectives achieved by this invention.

SUMMARY OF INVENTION

In accordance with the present invention, an improved gas generating system includes a plurality of product gas generating modules each of which modules comprises a plurality of molecular sieve beds generating a product gas acting in a repetitive cycle with each cycle having a period of peak product gas flow. Generally, a manifold combines the product gas from the plurality of modules. A processor or controller unit generates a control signal that is communicated to the gas generating modules such that the peak product gas flow period or portion of the repetitive cycle of the modules is adjusted in response to the control signal. The processor unit causes the peak period for the modules to be timed across the repetitive cycles in a controlled distribution.

The present invention defines a method of phasing multiple PSA concentrators to reduce peak input airflows. The graph of FIG. 3 illustrates the magnitude of airflow for 3 concentrators with all concentrators in-phase and with all concentrators driven out of phase according to the present invention. It can be seen that for the in-phase condition the peak airflow is approximately 3 times the flow of a single concentrator as would be expected. With the concentrators driven out-of-phase the peak airflow is less than twice the airflow for a single concentrator, a significant improvement. In practice, to properly drive multiple concentrators, the half-cycle time for a single concentrator is divided by N, where N is the number of concentrators. Each successive concentrator's PSA cycle is then shifted in time by the result.

In the ideal case, it would only be necessary to start multiple concentrators with the proper phasing and then allow each to continue to operate independently. This has some advantages from the standpoint of reliability since the failure of a single concentrator would not affect the operation of the others. In practice, the frequency of operation of each concentrator differs slightly from the others. Over a period of time, this frequency difference causes the phasing to shift, eventually resulting in multiple concentrators being in-phase or nearly so. In order to prevent this occurrence, a signal is periodically sent from one concentrator, acting as the primary or "lead" concentrator; to the other concentrators, acting as secondary or "responders," to re-establish the proper phasing.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
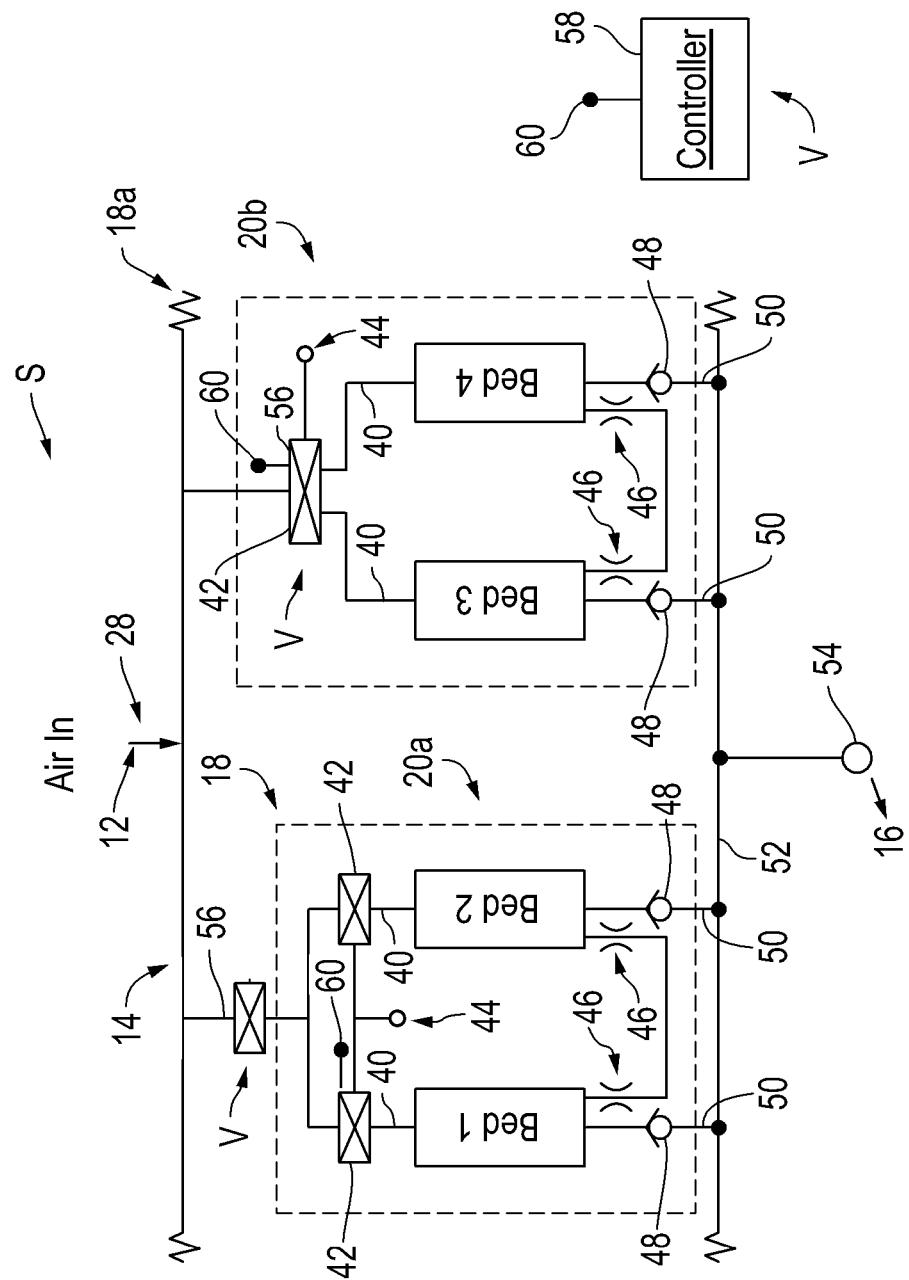
FIG. 1 is a pneumatic circuit according to the present invention.
Figure 2:
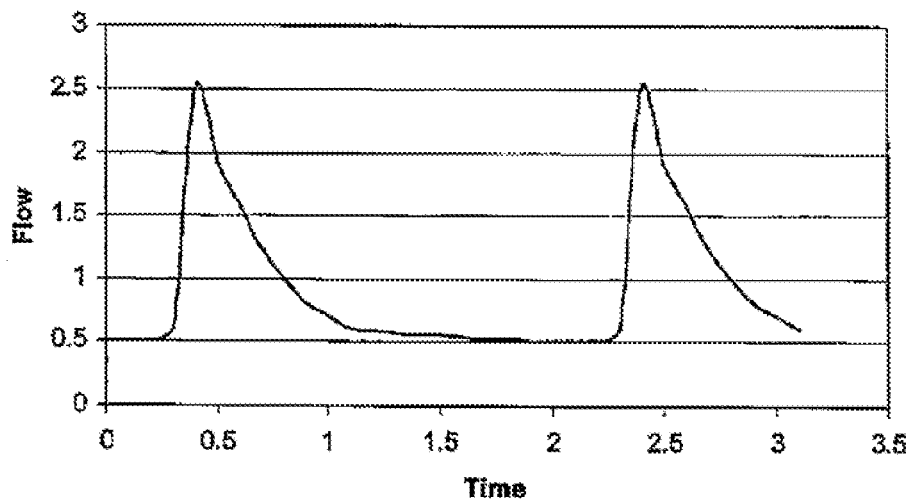
FIG. 2 is a graph showing a typical input airflow versus time for a single known PSA concentrator system.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A product gas concentration system S has an input air source or supply 28 for supplying an input gas 12 at a desired pressure. An oxygen concentrating system 14 produces an oxygen concentrated gas output 16 and includes at least 2 operable molecular sieve beds bed1, bed 2. An input flow path or line 14 communicates input gas from the input air source or supply 12 to the molecular sieve bed modules 20a or 20b.

The primary operation of the PSA system S is to provide a selected amount or flow rate of a desired product gas at a desired pressure. Higher flow rates of product gas are achieved by controlling the number of operable molecular sieve bed modules 18. Being able to selectively shut down or effectively disconnect or block a molecular sieve bed module 20a or 20b results in a decrease in the product gas delivered, but, more importantly, a decrease in the bleed air used when a larger quantity of product gas is not required. Specifically referring to FIG. 1, ambient air or other input gas 12 enters through air input 28. An air compressor (not shown), such as a scroll compressor or other suitable type, may additionally provide compressed air at specific flow and pressure values to support the demands of the system S.

An input flow path or manifold 14 conveys the pressurized air from the air supply or input 28 to the input side of modules 18 comprising the oxygen concentrator unit S. Such flow path 14 typically is a pipe, tube or other known pneumatic means adapted to convey the pressurized air without significant loss. Junction 18a in FIG. 1 demonstrates a possible connection point to the input air supply for additional modules 18.

The concentrating system S includes at least two molecular sieve bed units or modules 18 connected in a parallel, or tandem, pneumatic flow path. Two tandem molecular sieve bed modules 20a and 20b are shown by way of example in FIG. 1, although any number greater than two may be chosen. Generally, the number of molecular sieve bed modules is designated as "N." In the case of FIG. 1, N is equal to 2 by way of example.

Each molecular sieve bed module 18 preferably includes at least two individual molecular sieve beds bed 1 and bed 2 or bed 3 and bed 4 also connected in a pneumatic parallel flow path, or tandem, within the molecular sieve bed module 18. Typically, the molecular sieve beds bed 1, bed 2, bed 3, and bed 4 are known zeolite beds with each having an inlet 40.

Each molecular sieve bed bed 1, bed 2, bed 3, bed 4 has a sequencing valve 42 in the input flow path to sequentially port the air to the appropriate sieve bed, either to bed 1 or bed 2 of unit 20a, to bed 3 or bed 4 of unit 20b, or to both bed 1 or bed 2 of unit 20a and bed 3 or bed 4 of unit 20b. Such valve 42 may be a known slide valve, rotary valve or other suitable type, or multiple individual valves (such as separate valves that control the filling and purging of the beds independently). The two oxygen beds, bed 1 and bed 2, or bed 3 and bed 4, operate as an alternating pair so that when one bed is pressurized, adsorbing nitrogen, and producing oxygen-enriched product gas, the other bed is vented to ambient air using port 44. Also, schematically shown are cross flow orifices 46, check valves 48, and output tubing 50. The desired product gas, generally concentrated oxygen, flows into manifold 52 and is drawn out through output gas junction 54. Similarly, the oxygen gas junction 54 may be attached to optional pressure regulators, valves, or the like as desired.

Each molecular sieve bed module 18 may include a controllable shut-off valve 56 mounted in the input air flow path 22 between the air supply 10 and at least one of the molecular sieve bed modules 18. Valve 56 operates at a minimum in a manner to either fully pass or block air flow into the selected molecular sieve bed module 18 or at any other intermediate state that may be desired for the specific arrangement designed. The shut-off valve 56 effectively disconnects the appropriate molecular sieve bed module 18 from the input gas supply 10. For molecular sieve bed module 20b, the shut-off valve 56 is incorporated into the sequencing valve unit 42.

Generally, each molecular sieve bed module 18 has its respective sequencing valve unit 42 operably connected to a controller unit V. An electronic or mechanical switch controller 58 controls the operation of one or more sequencing valves 42 forming the controllable switching system V to remotely operate the valve 42. FIG. 1 schematically shows controller 58 connected to the valve unit 42 with operable connections 60. The controller 58 may cause a solenoid to activate the valve, as is commonly known in the art. Preferably, the controller 58 would be correlated to shutting-off or blocking one or more molecular sieve beds in the respective modules 18 as desired to achieve the desired flow rate or proportion of medical grade air to oxygen.

Yet another alternative embodiment would place the blocking valves in the discharge or output lines 50 exiting the molecular sieve beds. Such alternative placement of blocking valves would also act to shut down one or more individual sieve beds or molecular sieve bed units by preventing the passage of the gas through the molecular sieve beds.

It is believed that a plenum is not necessary on the output side of the present invention; however, a plenum may be desirable to assist in the smoothing of variations in the product gas concentration. Such a technique is also applicable to concentrators that concentrate gases other than oxygen, such as nitrogen (OBIGGS).

The present invention defines a method of phasing the multiple PSA concentrator modules 18 to reduce peak input airflows.

In the present invention the gas generating system S has a plurality of product gas generating modules 18 each of which modules 18 comprises a plurality of molecular sieve beds bed 1, bed 2, bed 3, bed 4 generating a product gas acting in a repetitive cycle with each cycle having a period of or portion of the cycle with peak product gas flow 106. Generally, a manifold 52 combines the product gas from the plurality of modules 18. The processor or controller unit 58 generates a control signal that is communicated to the gas generating modules 18 such that the peak product gas flow period or portion 106 of the repetitive cycle of the modules is adjusted in response to the control signal. The processor unit 58 causes the peak period 106 for the modules 18 to be timed across the repetitive cycles in a controlled distribution.

Figure 3:
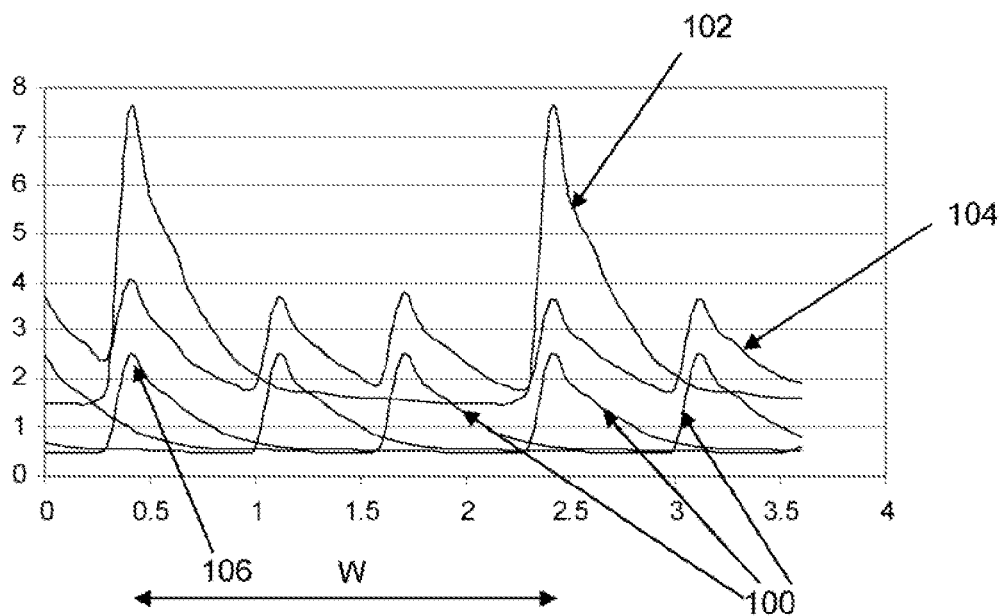
FIG. 3 is a graph showing a typical input airflow versus time for three PSA concentrator systems depicting both situations with three synchronized concentrators and three phased concentrators.

The graph of FIG. 3 illustrates the magnitude of airflow for 3 concentrators 100 with all concentrators in-phase 102 and with all concentrators driven out of phase 104 according to the present invention. It can be seen that for the in-phase condition, represented by line 102, the peak airflow is approximately 3 times the flow of a single concentrator as would be expected. With the concentrators driven out-of-phase, represented by line 104, the peak airflow is less than twice the airflow for a single concentrator, represented by the three overlapping lines 100 in FIG. 3, a significant improvement.

In practice according to the present invention, to properly drive multiple concentrator modules 18, the half-cycle time for a single concentrator, 20a or 20b for instance, is divided by N, where N is the number of concentrators. Each successive concentrator's PSA cycle is then shifted in time by the result. The wavelength W of the cycle is that period or time from the peak 106 for one module 18 to the next peak for that same module. Thus, there would be W/N time units between peaks 106 in the optimum phasing.

In the ideal case, it would only be necessary to start multiple concentrators 18 with the proper phasing and then allow each to continue to operate independently. This has some advantages from the standpoint of reliability since the failure of a single concentrator would not affect the operation of the others.

Generally, the frequency of operation of each concentrator module 18 differs slightly from the others. Over a period of time, this frequency difference causes the phasing to shift, eventually resulting in multiple concentrator modules 18 being in-phase or nearly so. In order to prevent this occurrence, a signal is periodically sent from one concentrator module 18, acting as the master, to the other concentrator modules 18, acting as slaves, to re-establish the proper phasing. The controller 58 would receive the signal from the master module 18 and then convey controlling signals to the remaining modules 18.

The foregoing disclosure and description of the invention are illustrative and explanatory thereof, and various changes in the size, shape and materials, as well as in the details of the illustrated construction may be made without departing from the spirit of the invention.

The invention claimed is:

1. An improved gas generating system of the type including a plurality of product gas generating modules each of which comprises a plurality of molecular sieve beds generating a product gas in a repetitive cycle with each cycle having a period of peak product gas flow, the improvement comprising:

a manifold for combining the product gas from the plurality of modules; and a processor means for generating a control signal communicated to the gas generating modules; the control signal causing peak product gas flow periods of the repetitive cycle of the modules to be adjusted in response to the control signal; and the processor causing the peak period for the modules to be timed across the repetitive cycles in a controlled distribution.

2. The invention of claim 1 wherein the peak period for each module is shifted from the peak period of the remaining module cycles by W/N time units where W represents the period of time between successive peaks for each of the number N modules.

3. The invention of claim 1 wherein the processor adjusts the peak period for each module to be substantially synchronized.

4. The invention of claim 1 wherein one module acts as a master module for establishing control of the peak period for coordinated phasing of the peak period for the remaining modules to be synchronized.

5. A method for generating a desired product gas with a gas generating system of the type including a plurality of product gas generating modules each of which comprises a plurality of molecular sieve beds generating a product gas in a repetitive cycle with each cycle having a period of peak product gas flow, the steps including:

combining the product gas from the plurality of modules with a manifold; and generating a control signal with a processor with the control signal communicated to the gas generating modules; the control signal causing peak product gas flow periods of the repetitive cycle of the modules to be adjusted in response to the control signal; and the processor causing the peak period for the modules to be timed across the repetitive cycles in a controlled distribution.

6. The method of claim 5 wherein the peak period for each module is shifted from the peak period of the remaining module cycles by W/N time units where W represents the period of time between successive peaks for each of the number N modules.

7. The method of claim 5 wherein the processor adjusts the peak period for each module to be substantially synchronized.

8. The method of claim 5 wherein one module acts as a master module for establishing control of the peak period for coordinated phasing of the peak period for the remaining modules to be synchronized.

* * * * *